United States Patent
Yamazaki

(10) Patent No.: US 9,112,224 B2
(45) Date of Patent: Aug. 18, 2015

(54) ENERGY STORAGE DEVICE AND METHOD FOR MANUFACTURING THE SAME

(75) Inventor: Shunpei Yamazaki, Tokyo (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 403 days.

(21) Appl. No.: 13/163,879

(22) Filed: Jun. 20, 2011

(65) Prior Publication Data

US 2012/0003535 A1   Jan. 5, 2012

(30) Foreign Application Priority Data

Jun. 30, 2010 (JP) ................. 2010-149840

(51) Int. Cl.
| | |
|---|---|
| *H01M 4/38* | (2006.01) |
| *H01G 11/06* | (2013.01) |
| *H01G 11/50* | (2013.01) |
| *H01M 4/134* | (2010.01) |
| *H01M 4/36* | (2006.01) |

(Continued)

(52) U.S. Cl.
CPC ............ *H01M 4/386* (2013.01); *H01G 11/06* (2013.01); *H01G 11/50* (2013.01); *H01M 4/0471* (2013.01); *H01M 4/134* (2013.01); *H01M 4/366* (2013.01); *H01M 4/405* (2013.01); *H01M 4/0404* (2013.01); *H01M 4/0419* (2013.01); *H01M 4/0426* (2013.01); *H01M 10/052* (2013.01); *H01M 2004/021* (2013.01); *Y02E 60/122* (2013.01); *Y02E 60/13* (2013.01); *Y02T 10/7011* (2013.01); *Y02T 10/7022* (2013.01); *Y10T 29/417* (2015.01); *Y10T 29/49108* (2015.01); *Y10T 29/49115* (2015.01)

(58) Field of Classification Search
None
See application file for complete search history.

(56) References Cited

U.S. PATENT DOCUMENTS

| | | | |
|---|---|---|---|
| 3,796,598 A | 3/1974 | Gejyo et al. | |
| 4,155,781 A | 5/1979 | Diepers | |

(Continued)

FOREIGN PATENT DOCUMENTS

| | | | |
|---|---|---|---|
| CN | 101060170 A | 10/2007 | |
| EP | 0582173 A | 2/1994 | |

(Continued)

OTHER PUBLICATIONS

Fuller et al. Phys. Rev. 96 (1) 1954, 21-24.*

(Continued)

*Primary Examiner* — Carlos Barcena
*Assistant Examiner* — Wojciech Haske
(74) *Attorney, Agent, or Firm* — Nixon Peabody LLP; Jeffrey L. Costellia

(57) ABSTRACT

Provided are an energy storage device including an electrode in which lithium is introduced into a silicon layer and a method for manufacturing the energy storage device. A silicon layer is formed over a current collector, a solution including lithium is applied on the silicon layer, and heat treatment is performed thereon; thus, at least lithium can be introduced into the silicon layer. By using the solution including lithium, even when the silicon layer includes a plurality of silicon microparticles, the solution including lithium can enter a space between the microparticles and lithium can be introduced into the silicon microparticles which are in contact with the solution including lithium. Moreover, even when the silicon layer is a thin silicon film or includes a plurality of whiskers or whisker groups, the solution can be uniformly applied; accordingly, lithium can be included in silicon easily.

10 Claims, 10 Drawing Sheets

(51) Int. Cl.
*H01M 4/40* (2006.01)
*H01M 4/04* (2006.01)
*H01M 10/052* (2010.01)
*H01M 4/02* (2006.01)

(56) References Cited

U.S. PATENT DOCUMENTS

| | | |
|---|---|---|
| 5,395,711 A | 3/1995 | Tahara et al. |
| 5,401,599 A | 3/1995 | Tahara et al. |
| RE35,818 E | 6/1998 | Tahara et al. |
| 6,451,113 B1 | 9/2002 | Givargizov |
| 6,685,804 B1 | 2/2004 | Ikeda et al. |
| 6,887,511 B1 | 5/2005 | Shima et al. |
| 7,015,496 B2 | 3/2006 | Ohnuma et al. |
| 7,192,673 B1 | 3/2007 | Ikeda et al. |
| 7,235,330 B1 | 6/2007 | Fujimoto et al. |
| 7,241,533 B1 | 7/2007 | Ikeda et al. |
| 7,396,409 B2 | 7/2008 | Hatta et al. |
| 7,410,728 B1 | 8/2008 | Fujimoto et al. |
| 7,794,881 B1 | 9/2010 | Fujimoto et al. |
| 8,080,334 B2 | 12/2011 | Kogetsu et al. |
| 8,101,298 B2 | 1/2012 | Green et al. |
| 8,597,831 B2 | 12/2013 | Green et al. |
| 8,888,870 B2 | 11/2014 | Kogetsu et al. |
| 2006/0040182 A1 | 2/2006 | Kawakami et al. |
| 2006/0216604 A1 | 9/2006 | Kawase et al. |
| 2006/0228468 A1 | 10/2006 | Lain et al. |
| 2008/0113270 A1* | 5/2008 | Hirose et al. ............ 429/231.95 |
| 2008/0124598 A1 | 5/2008 | Backhaus-Ricoult et al. |
| 2009/0061322 A1 | 3/2009 | Kawakami et al. |
| 2010/0209784 A1 | 8/2010 | Yamazaki et al. |
| 2011/0151290 A1 | 6/2011 | Cui et al. |
| 2014/0045062 A1 | 2/2014 | Green et al. |

FOREIGN PATENT DOCUMENTS

| | | |
|---|---|---|
| EP | 1912270 A | 4/2008 |
| EP | 2302720 A | 3/2011 |
| EP | 2472653 A | 7/2012 |
| JP | 61-214359 A | 9/1986 |
| JP | 2001-210315 | 8/2001 |
| JP | 2002-083594 | 3/2002 |
| JP | 2003-246700 | 9/2003 |
| JP | 2004-224576 | 8/2004 |
| JP | 2004-281317 | 10/2004 |
| JP | 2006-269331 A | 10/2006 |
| JP | 2007-502002 | 2/2007 |
| JP | 2008-117785 A | 5/2008 |
| JP | 2008-243828 A | 10/2008 |
| JP | 2009-523923 | 6/2009 |
| TW | 242200 | 3/1995 |
| TW | 1235517 | 7/2005 |
| TW | 1279022 | 4/2007 |
| TW | 200840130 | 10/2008 |
| WO | WO-2004/086539 | 10/2004 |
| WO | WO-2005/018030 | 2/2005 |
| WO | WO-2007/083155 | 7/2007 |
| WO | WO-2008/066853 | 6/2008 |

OTHER PUBLICATIONS

Mehrer "Diffusion in Solids" Springer 2007 Library of Congress Control No. 2007923017.*

Kamins.T et al., "Ti-catalyzed Si nanowires by chemical vapor deposition: Microscopy and growth mechanisms,", J. Appl. Phys. (Journal of Applied Physics), Jan. 15, 2001, vol. 89, No. 2, pp. 1008-1016.

Kohno.H et al., "Silicon Nanoneedles Grown by a Simple Thermal Treatment Using Metal-Sulfur Catalysts,", Jpn. J. Appl. Phys. (Japanese Journal of Applied Physics), Feb. 1, 2002, vol. 41, Part 1, No. 2A, pp. 577-578.

Cui.L et al., "Crystalline-Amorphous Core-Shell Silicon Nanowires for High Capacity and High Current Battery Electrodes,", Nano Letters, 2009, vol. 9, No. 1, pp. 491-495.

Chinese Office Action (Application No. 201110177490.9) Dated Aug. 5, 2014.

Taiwanese Office Action (Application No. 100122625) Dated Mar. 6, 2015.

* cited by examiner

ENERGY STORAGE DEVICE AND METHOD FOR MANUFACTURING THE SAME

BACKGROUND OF THE INVENTION

1. Field of the Invention

The present invention relates to an energy storage device and a method for manufacturing the energy storage device.

Note that the energy storage device refers to all elements and devices which have a function of storing electric power.

2. Description of the Related Art

In recent years, energy storage devices such as lithium ion secondary batteries, lithium ion capacitors, and air cells have been developed.

An electrode for an energy storage device is manufactured by providing an active material over a surface of a current collector. As the active material, a material such as carbon or silicon, which can store and release ions serving as carriers, is used. In particular, silicon or phosphorus-doped silicon has a higher theoretical capacity than carbon, and the use of these materials as the active material is preferable in terms of increasing the capacity of an energy storage device (e.g., Patent Document 1).

REFERENCE

Patent Document

[Patent Document 1] Japanese Published Patent Application No. 2001-210315

SUMMARY OF THE INVENTION

In an energy storage device, in the case where a material which does not include lithium is used for a positive electrode active material, a negative electrode active material needs to include lithium. Even in the case where a material including lithium is used for the positive electrode active material, inclusion of a certain amount of lithium in a negative electrode before the energy storage device is manufactured is effective for capacity design of the energy storage device in consideration of irreversible capacity. Further, lithium stored in the negative electrode is not completely released, whereby a possibility that performance of the electrode is degraded by overload at the time of charge or discharge can be reduced and the cycle characteristics of the energy storage device can be improved. However, when silicon is used for the negative electrode active material, lithium needs to be included in silicon before the energy storage device is manufactured. Inclusion of lithium in silicon increases the electric conductivity of silicon; thus, the internal resistance of the energy storage device can be reduced and the energy efficiency can be improved. Thus, an object of one embodiment of the present invention is to provide an energy storage device including an electrode in which lithium is introduced into a silicon layer and a method for manufacturing the energy storage device.

One embodiment of the present invention is a method for manufacturing an energy storage device, including the steps of forming a silicon layer over a current collector; applying a solution including lithium on the silicon layer; and performing heat treatment thereon. Accordingly, at least lithium is introduced into the silicon layer.

Another embodiment of the present invention is a method for manufacturing an energy storage device, including the steps of forming a silicon layer over a current collector; applying a liquid in which a particle including lithium is dispersed on the silicon layer; and performing heat treatment thereon. Accordingly, at least lithium is introduced into the silicon layer.

Another embodiment of the present invention is a method for manufacturing an energy storage device, including the steps of forming a silicon layer over a current collector; spraying a particle including lithium on the silicon layer; and performing heat treatment thereon. Accordingly, at least lithium is introduced into the silicon layer.

Another embodiment of the present invention is a method for manufacturing an energy storage device, including the steps of forming a silicon layer over a current collector; forming a film including lithium on the silicon layer; and performing heat treatment thereon. Accordingly, at least lithium is introduced into the silicon layer.

In the above embodiment, the silicon layer may include a plurality of whiskers of crystalline silicon.

In the above embodiment, it is preferable to use a solution which does not or is unlikely to corrode silicon as the solution including lithium. Mild corrosivity of the solution has an effect of making a surface of silicon uneven to increase the surface area; however, when the corrosivity is too high, silicon provided over the current collector is dissolved completely or peeled off not to function as an active material. It is preferable to use a solution whose corrosivity is adjusted so that the thickness of a thinnest portion of the silicon layer after the heat treatment becomes half or more of the thickness of the thinnest portion before the heat treatment.

In the above embodiment, the particle including lithium refers to a particle that includes lithium metal, a compound including lithium, an alloy including lithium, or the like.

In the above embodiment, a compound other than lithium fluoride (LiF) is preferably used as the compound including lithium. For example, lithium hydroxide (LiOH), lithium oxide ($Li_2O$), lithium carbonate ($Li_2CO_3$), lithium chloride (LiCl), lithium metasilicate ($Li_2SiO_3$), lithium orthosilicate ($Li_4SiO_4$), lithium iodide (LiI), lithium acetate ($CH_3CO_2Li$), lithium phosphate ($Li_3PO_4$), lithium nitrate ($LiNO_3$), and the like are given. In addition, as the alloy including lithium, a lithium-silicon alloy ($Li_xSi_{1-x}$ (x is greater than 0 and less than 1)), a lithium-aluminum alloy ($Li_xAl_{1-x}$ (x is greater than 0 and less than 1)), and the like are given.

Another embodiment of the present invention is an energy storage device including a negative electrode including a negative electrode current collector and a negative electrode active material over the negative electrode current collector; and a positive electrode facing the negative electrode with an electrolyte positioned between the positive electrode and the negative electrode. The negative electrode active material includes an alloy including silicon and lithium. Before the energy storage device is charged or discharged for the first time after being manufactured, a second portion of the negative electrode active material has a higher lithium concentration than a first portion of the negative electrode active material. The second portion is closer to an outer surface of the negative electrode active material than the first portion.

Another embodiment of the present invention is an energy storage device including a negative electrode including a negative electrode current collector and a negative electrode active material over the negative electrode current collector; and a positive electrode facing the negative electrode with an electrolyte positioned between the positive electrode and the negative electrode. The negative electrode active material has a film form. The negative electrode active material includes an alloy including silicon and lithium. Before the energy storage device is charged or discharged for the first time after being manufactured, a superficial portion of the negative electrode active material has a higher lithium concentration than a side of the negative electrode active material close to the negative electrode current collector.

In the above embodiment, the negative electrode active material may include a whisker.

In the above embodiment, a conductive layer may be formed in a superficial portion of the negative electrode active material.

According to one embodiment of the present invention, an energy storage device including an electrode in which lithium is introduced into a silicon layer can be manufactured.

DETAILED DESCRIPTION OF THE INVENTION

Figure 1A:
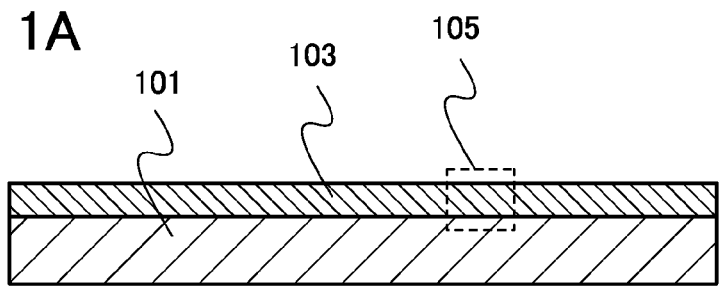
FIGS. 1A to 1D are examples of cross-sectional views illustrating a method for manufacturing a negative electrode of an energy storage device.

Hereinafter, embodiments and an example of the present invention will be described with reference to the drawings. Note that the present invention is not limited to the following description, and it is easily understood by those skilled in the art that the mode and detail can be changed in various ways without departing from the spirit and scope of the present invention. Therefore, the present invention is not construed as being limited to the following description of the embodiments. In description referring to the drawings, in some cases, the same reference numerals are used in common for the same portions in different drawings. Further, in some cases, the same hatching patterns are applied to similar parts, and the similar parts are not necessarily designated by reference numerals.

Embodiment 1

In this embodiment, an electrode of an energy storage device which is one embodiment of the present invention and a method for manufacturing the electrode will be described.

The method for manufacturing the electrode of the energy storage device will be described with reference to FIGS. 1A to 1D, FIG. 2, and FIG. 3.

First, a silicon layer is formed as an active material layer 103 over a current collector 101 by an evaporation method, a sputtering method, a plasma CVD method, or a thermal CVD method, preferably a low-pressure chemical vapor deposition (LPCVD) method. Alternatively, the active material layer 103 may be formed using a plurality of silicon microparticles (see FIG. 1A).

The current collector 101 functions as a current collector of the electrode. Thus, a conductive material having a foil shape, a plate shape, or a net shape is used. For example, the current collector 101 can be formed using a metal element having high conductivity typified by platinum, aluminum, copper, titanium, or the like. Further, the current collector 101 may be formed using an aluminum alloy to which an element that improves heat resistance, such as silicon, titanium, neodymium, scandium, or molybdenum, is added. The current collector 101 may be formed using a metal element that forms silicide. Examples of the metal element that forms silicide include zirconium, titanium, hafnium, vanadium, niobium, tantalum, chromium, molybdenum, tungsten, cobalt, nickel, and the like. The current collector 101 can be formed by a sputtering method or a CVD method.

The active material layer 103 is a silicon layer. The silicon layer can be formed by a plasma CVD method or a thermal CVD method, preferably an LPCVD method. In this case, the silicon layer is formed using a deposition gas including silicon as a source gas. Examples of the deposition gas including silicon are silicon hydride, silicon fluoride, silicon chloride, and the like; typically, $SiH_4$, $Si_2H_6$, $SiF_4$, $SiCl_4$, $Si_2Cl_6$, and the like are given. Note that a rare gas such as helium, neon, argon, or xenon or hydrogen may be mixed in the source gas. Note that the active material layer 103 may be formed by an evaporation method or a sputtering method. Alternatively, the active material layer 103 may be formed using a plurality of silicon microparticles and a binder or the like.

Note that oxygen is included as an impurity in the active material layer 103 in some cases. This is because oxygen is desorbed from a quartz chamber of an LPCVD apparatus by heating performed in the formation of the silicon layer as the active material layer 103 by an LPCVD method, and the oxygen diffuses into the silicon layer.

Further, an impurity element imparting one conductivity type, such as phosphorus or boron, may be added to the silicon layer for forming the active material layer 103. A silicon layer to which an impurity element imparting one conductivity type, such as phosphorus or boron, is added has higher conductivity, so that the electric conductivity of the electrode can be increased. Therefore, the discharge capacity can be further increased. In the case where the active material layer 103 is formed by a plasma CVD method, a thermal CVD method, or an LPCVD method, film formation may be performed in an atmosphere including an impurity element imparting one conductivity type, such as phosphorus or boron. For example, in order to add phosphorus to the silicon layer, phosphine may be included in a source gas. In the case where the active material layer 103 is formed by an evaporation method or a sputtering method, the silicon layer may be doped with an impurity element imparting one conductivity type, such as phosphorus or boron.

Note that there is no particular limitation on crystallinity of the silicon layer formed as the active material layer 103. The silicon layer may be amorphous or crystalline. As the silicon layer formed as the active material layer 103, an amorphous silicon layer, a microcrystalline silicon layer, or a polycrystalline silicon layer can be used, for example. Here, the silicon layer may be subjected to a crystallization step. The crystallization step may be performed on the silicon layer in such a manner that the hydrogen concentration in the silicon layer is sufficiently reduced, and then the silicon layer is crystallized by heat treatment which the silicon layer can withstand or by irradiation with laser light.

When the silicon layer is formed as the active material layer 103 by an LPCVD method, a low-silicon-density region is not formed between the current collector 101 and the active material layer 103, electrons transfer easily at the interface between the current collector 101 and the active material layer 103, and the adhesion between the current collector 101 and the active material layer 103 can be increased. This can be explained by the following reason: active species of the source gas are constantly supplied to the silicon layer that is being deposited in a step of forming the silicon layer, so that a low-silicon-density region is unlikely to be formed in the silicon layer even if silicon diffuses into the current collector 101 from the silicon layer and a region lacking silicon (a sparse region) is formed, because the active species of the source gas are constantly supplied to the region. In addition, the silicon layer is formed over the current collector 101 by vapor-phase growth; therefore, productivity of the energy storage device is increased.

Figure 1B:
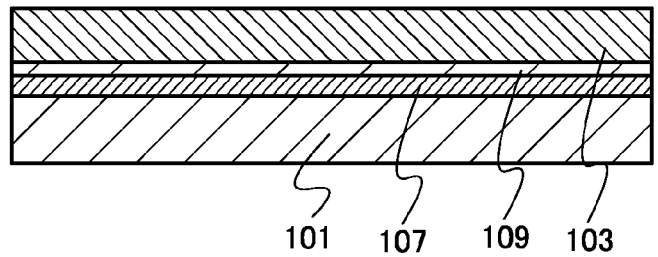

Here, an enlarged view of the current collector 101 and the active material layer 103 in a portion surrounded by a dashed line 105 is illustrated in FIG. 1B.

As illustrated in FIG. 1B, a mixed layer 107 is formed between the current collector 101 and the active material layer 103 in some cases. In that case, the mixed layer 107 is formed using silicon and a metal element included in the current collector 101. Note that silicon is diffused into the current collector 101 by heating performed in the formation of the silicon layer as the active material layer 103; thus, the mixed layer 107 is formed.

In the case where the current collector 101 is formed using a metal element that forms silicide, silicide is formed in the mixed layer 107; typically, one or more of zirconium silicide, titanium silicide, hafnium silicide, vanadium silicide, niobium silicide, tantalum silicide, chromium silicide, molybdenum silicide, tungsten silicide, cobalt silicide, and nickel silicide are formed. Alternatively, an alloy layer of silicon and a metal element is formed.

Note that oxygen is included as an impurity in the mixed layer 107 in some cases. This is because oxygen is desorbed from the quartz chamber of the LPCVD apparatus by the heating performed in the formation of the silicon layer as the active material layer 103 by an LPCVD method, and the oxygen diffuses into the mixed layer 107.

Over the mixed layer 107, a metal oxide layer 109 which includes an oxide of the metal element is formed in some cases. Note that when a crystalline silicon layer is formed by an LPCVD method, by filling the chamber with a rare gas such as helium, neon, argon, or xenon, formation of the metal oxide layer 109 can be suppressed.

In the case where the current collector 101 is formed using a metal element that forms silicide, zirconium oxide, titanium oxide, hafnium oxide, vanadium oxide, niobium oxide, tantalum oxide, chromium oxide, molybdenum oxide, tungsten oxide, cobalt oxide, nickel oxide, or the like is typically formed as the metal oxide layer 109. Note that when the current collector 101 is a layer including a metal element such as titanium, zirconium, niobium, or tungsten, the metal oxide layer 109 includes an oxide semiconductor such as titanium oxide, zirconium oxide, niobium oxide, or tungsten oxide; thus, resistance between the current collector 101 and the active material layer 103 can be reduced and the electric conductivity of the electrode can be increased. Therefore, the discharge capacity can be further increased.

With the mixed layer 107 between the current collector 101 and the active material layer 103, the resistance between the current collector 101 and the active material layer 103 can be reduced; thus, the electric conductivity of the electrode can be increased. Therefore, the discharge capacity can be further increased. In addition, the adhesion between the current collector 101 and the active material layer 103 can be increased, so that degradation of the energy storage device can be suppressed.

In the case where a material which does not include lithium is used for a positive electrode active material, a negative electrode active material needs to include lithium. Even in the case where a material including lithium is used for the positive electrode active material, inclusion of a certain amount of lithium in a negative electrode is effective for capacity design of the energy storage device in consideration of irreversible capacity. Further, lithium stored in the negative electrode is not completely released, whereby a possibility that performance of the electrode is degraded by overload at the time of charge or discharge can be reduced and the cycle characteristics of the energy storage device can be improved.

In the case where silicon is used for the negative electrode active material, lithium can be included in silicon in the following manner. A solution including lithium is applied on the silicon layer and heat treatment is performed thereon, so that at least lithium can be introduced into the silicon layer. By using the solution including lithium, even when the silicon layer is formed using a plurality of silicon microparticles, the solution including lithium can enter a space between the microparticles and lithium can be introduced into the silicon microparticles which are in contact with the solution including lithium. Moreover, by using the solution including lithium, even when the silicon layer is a thin silicon film or includes a plurality of whiskers or whisker groups described later, the solution can be uniformly applied. A spin coating method, a dipping method, a spray method, or the like may be used as a method for the application. Such a method enables lithium to be included in silicon more easily.

In the above description, it is preferable to use a solution which does not or is unlikely to corrode silicon as the solution including lithium. Mild corrosivity of the solution has an effect of making a surface of silicon uneven to increase the surface area; however, when the corrosivity is too high, silicon provided over the current collector is dissolved completely or peeled off not to function as an active material. It is preferable to use a solution whose corrosivity is adjusted so that the thickness of a thinnest portion of the silicon layer after the heat treatment becomes half or more of the thickness of the thinnest portion before the heat treatment.

The following method can be employed as well. A liquid in which particles including lithium are dispersed is applied on the silicon layer and heat treatment is performed thereon, so that at least lithium can be introduced into the silicon layer. By applying the liquid in which the particles including lithium are dispersed, the particles including lithium can be uniformly dispersed on and attached to the silicon layer. A slurry obtained by adjusting the amounts of particles and liquid can also be applied. By using the liquid in which the particles including lithium are dispersed, the particles are less likely to separate from the silicon layer when the liquid is dried, which realizes easy handling of the silicon layer.

As the liquid in which the particles including lithium are to be dispersed, water or an organic solvent (e.g., ethanol, methanol, acetone, glycerin, ethylene glycol, or liquid paraffin) can be used.

An organic substance (e.g., glucose) may be dissolved in the solution including lithium or the liquid in which the particles including lithium are dispersed. With the use of a liquid in which an organic solvent or an organic substance is dissolved, a carbon layer can be attached to a surface of silicon by heat treatment performed later. The attachment of the carbon layer to the surface of silicon can improve the conductivity, and the attached carbon layer makes peel-off of silicon difficult. Accordingly, the cycle characteristics can be improved.

The following method can be employed as well. Particles including lithium are sprayed on the silicon layer and heat treatment is performed thereon, so that at least lithium can be introduced into the silicon layer. By directly spraying the particles including lithium, treatment can be performed easily.

The particle including lithium refers to a particle that includes lithium metal, a compound including lithium, an alloy including lithium, or the like.

In the above description, a compound other than lithium fluoride (LiF) is preferably used as the compound including lithium. For example, lithium hydroxide (LiOH), lithium oxide ($Li_2O$), lithium carbonate ($Li_2CO_3$), lithium chloride (LiCl), lithium metasilicate ($Li_2SiO_3$), lithium orthosilicate ($Li_4SiO_4$), lithium iodide (LiI), lithium acetate ($CH_3CO_2Li$), lithium phosphate ($Li_3PO_4$), lithium nitrate ($LiNO_3$), and the like are given. In addition, as the alloy including lithium, a lithium-silicon alloy ($Li_xSi_{1-x}$ (x is greater than 0 and less than 1)), a lithium-aluminum alloy (x is greater than 0 and less than 1)), and the like are given.

The following method can be employed as well. A film including lithium is formed on the silicon layer and heat treatment is performed, so that at least lithium can be introduced into the silicon layer. As a method for forming the film including lithium on the silicon layer, a dry method such as a PVD method (e.g., a sputtering method), a vacuum evaporation method, or a CVD method (e.g., a plasma CVD method, a thermal CVD method, an LPCVD method, or a metal organic chemical vapor deposition (MOCVD) method) can be used. By forming the film including lithium by a dry method, the film including lithium can be formed to be uniform and thin. Moreover, the film thickness can be easily controlled in the dry method; therefore, the amount of lithium with respect to that of silicon can be easily controlled. Thus, conditions that have high reproducibility can be set.

The heat treatment by which lithium is introduced into the silicon layer may include plural steps. For example, a first step in which a liquid is dried and a second step in which lithium is introduced into the silicon layer may be performed. The first step may be performed at a temperature higher than or equal to 20° C. and lower than or equal to 200° C., for example. The process time may be greater than or equal to 30 seconds and less than or equal to 10 minutes, preferably greater than or equal to 1 minute and less than or equal to 3 minutes. The heat treatment of the second step in which lithium is introduced into the silicon layer is preferably performed at a temperature higher than or equal to 200° C. and lower than or equal to 800° C., further preferably higher than or equal to 500° C. and lower than or equal to 700° C., for example. The heat treatment may be performed for greater than or equal to 30 minutes and less than or equal to 40 hours, preferably greater than or equal to 1 hour and less than or equal to 10 hours. The atmosphere of the heat treatment is preferably a rare gas atmosphere, a nitrogen atmosphere, or the like. For example, the heat treatment can be performed at 600° C. for 4 hours in a nitrogen atmosphere. The liquid may be dried naturally or by spin drying instead of by the first step. The second step may be performed without performing the first step.

The amount of lithium introduced into the silicon layer can be controlled by changing the condition of the heat treatment.

The above heat treatment can enhance introduction of lithium into the silicon layer. As a result, a surface side of a silicon active material has a high concentration of lithium in silicon. In the case where the silicon layer is a thin film, a superficial portion thereof has a higher lithium concentration than a side close to the current collector. In the case where the silicon layer includes a plurality of whiskers or whisker groups described later, the whisker has a high lithium concentration on its surface side. In the case where the silicon layer is formed using a plurality of silicon microparticles, a surface side of the silicon microparticle has a high lithium concentration.

In some cases, lithium that is not introduced into the silicon layer is precipitated on the surface of the silicon layer as a substance including lithium. Before the negative electrode is incorporated in the energy storage device, the substance including lithium, which is precipitated on the surface of the silicon layer, may be removed with water or an organic solvent.

Further, heat treatment may be performed again after the substance including lithium, which is precipitated on the surface of the silicon layer, is removed. Lithium is further diffused in silicon by the heat treatment performed after the cleaning, and thus the lithium concentration can be uniform. The heat treatment is preferably performed at a temperature higher than or equal to 200° C. and lower than or equal to 800° C., further preferably higher than or equal to 500° C. and lower than or equal to 700° C. The heat treatment may be performed for greater than or equal to 30 minutes and less than or equal to 40 hours, preferably greater than or equal to 1 hour and less than or equal to 10 hours. The atmosphere of the heat treatment is preferably a rare gas atmosphere, a nitrogen atmosphere, or the like. For example, the heat treatment can be performed at 600° C. for 4 hours in a nitrogen atmosphere.

Inclusion of lithium in silicon can increase the electric conductivity of the silicon layer; thus, the internal resistance of the energy storage device can be reduced and the energy efficiency can be improved.

Figure 1C:
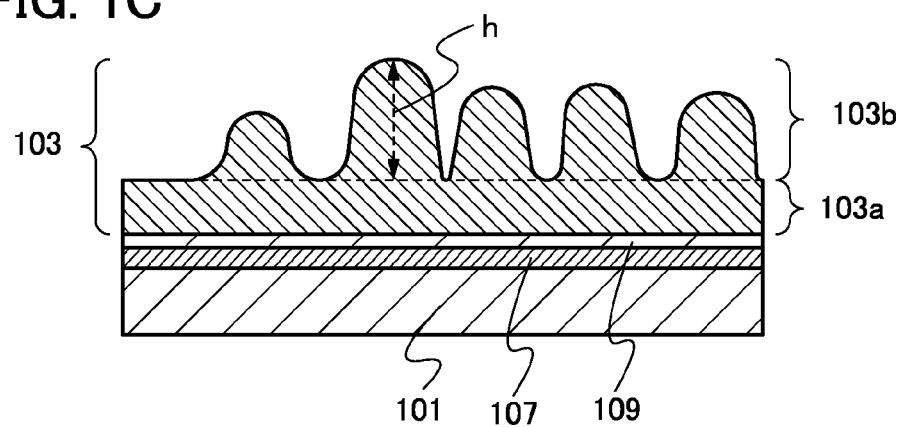

In addition, when the active material layer 103 is formed by an LPCVD method, the active material layer 103 can include a crystalline silicon region 103a and a crystalline silicon region 103b including a whisker over the crystalline silicon region 103a (see FIG. 1C). The crystalline silicon region 103b including a whisker includes a plurality of whiskers or a plurality of whisker groups. For example, the active material layer 103 including the crystalline silicon region 103a and the crystalline silicon region 103b including a whisker over the crystalline silicon region 103a can be formed using a gas including silicon, such as silane, as a source gas while heating is performed at a temperature higher than 550° C. and lower than or equal to a temperature which an LPCVD apparatus and the current collector 101 can withstand, preferably higher than or equal to 580° C. and lower than 650° C.

Note that the boundary between the crystalline silicon region 103a and the crystalline silicon region 103b including a whisker is not clear. Here, a plane that includes one of valleys formed between whiskers in the crystalline silicon region 103b including a whisker is regarded as a tentative boundary between the crystalline silicon region 103a and the crystalline silicon region 103b including a whisker.

Provision of the crystalline silicon region 103b including a whisker makes the surface area of the active material layer 103 much larger than that in the case where the surface of the active material layer 103 is flat, and contributes to improvement in the rate characteristics in charge and discharge. Furthermore, inclusion of lithium in silicon leads to a sufficient reduction in resistance to a tip of the whisker, so that the entire surface area can be effectively used.

The crystalline silicon region 103a is provided so as to cover the current collector 101. The whisker in the crystalline silicon region 103b may have a columnar shape such as a cylinder shape or a prism shape, or a needle shape such as a cone shape or a pyramid shape as long as the whisker is a crystalline protrusion. The top of the whisker may be curved. The diameter of the whisker is greater than or equal to 50 nm and less than or equal to 10 μm, preferably greater than or equal to 500 nm and less than or equal to 3 μm. In addition, the length of the whisker is greater than or equal to 0.5 μm and less than or equal to 1000 μm, preferably greater than or equal to 1.0 μm and less than or equal to 100 μm.

In the case where the whisker has a columnar shape, the length of the whisker corresponds to the distance between the top surface and the bottom surface of the whisker; in the case where the whisker has a cone shape, the length of the whisker corresponds to the distance between the apex and the bottom surface of the whisker. In addition, the maximum thickness of the active material layer 103 refers to the sum of the thickness of the crystalline silicon region 103a and the thickness of the crystalline silicon region 103b including a whisker. The thickness of the crystalline silicon region 103b including a whisker refers to the distance from the maximum height point of the whiskers to the boundary between the crystalline silicon region 103a and the crystalline silicon region 103b including a whisker.

Hereinafter, the direction in which the whisker grows (the direction in which the whisker extends from the crystalline silicon region 103a) may be referred to as a long-side direction. A cross-sectional shape along the long-side direction may be referred to as a long-side cross-sectional shape. In addition, the shape of a cross section in which the long-side direction is a normal direction may be referred to as a transverse cross-sectional shape.

As illustrated in FIG. 1C, the long-side directions of the plurality of whiskers may be one direction, for example, the normal direction to the surface of the crystalline silicon region 103a. In this case, the long-side directions of the protrusions may be substantially the same as the normal direction to the surface of the crystalline silicon region 103a, and it is preferable that the difference between the angles of the directions be typically within 5°. That is, the long-side cross-sectional shapes of the whiskers are mainly illustrated in FIG. 1C.

Figure 1D:
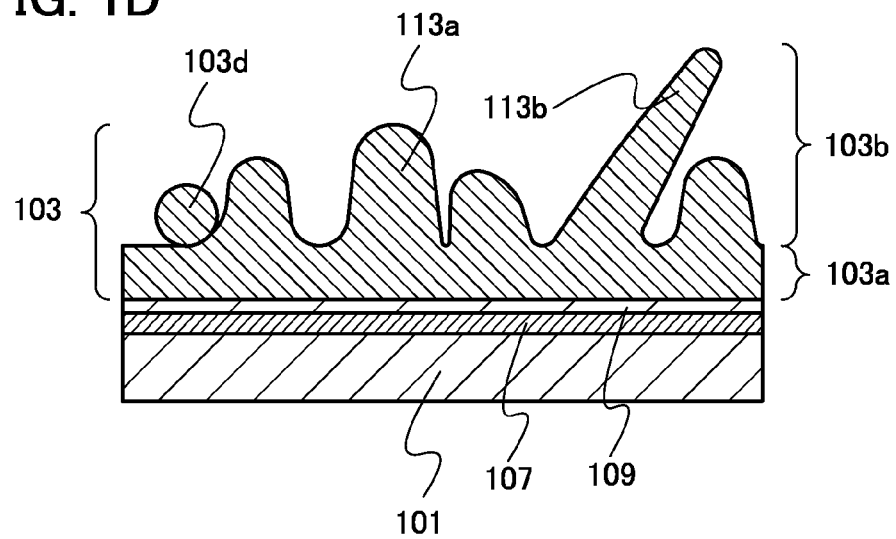

As illustrated in FIG. 1D, the long-side directions of the plurality of whiskers may be uneven. When the long-side directions of the plurality of whiskers are uneven, the whiskers are tangled with each other in some cases; therefore, the whiskers are unlikely to be detached in charge and discharge of the energy storage device. Typically, the crystalline silicon region 103b including a whisker may include a first whisker 113a whose long-side direction is substantially the same as the normal direction to the surface of the crystalline silicon region 103a and a second whisker 113b whose long-side direction is different from the normal direction to the surface of the crystalline silicon region 103a. Further, the second whisker may be longer than the first whisker. That is, FIG. 1D illustrates a transverse cross-sectional shape of a whisker like a region 103d, in addition to long-side cross-sectional shapes of whiskers. The region 103d is circular because it is the transverse cross-sectional shape of a whisker having a cylinder or cone shape. However, when the whisker has a prism or pyramid shape, the transverse cross-sectional shape illustrated as the region 103d is polygonal.

After lithium is introduced into the silicon layer, a conductive layer may be formed over the surface of the active material. Alternatively, lithium may be introduced into the silicon layer after the conductive layer is formed over the surface of the active material.

Figure 2:
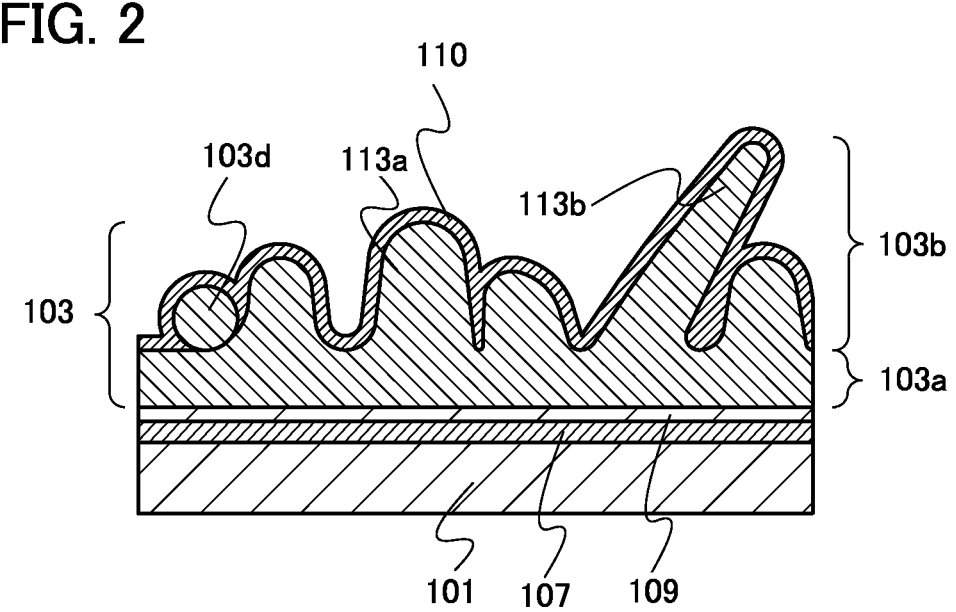
FIG. 2 is an example of a cross-sectional view illustrating a method for manufacturing a negative electrode of an energy storage device.

Over the surface of the active material in which lithium is introduced into silicon, a conductive layer 110 is formed by a CVD method, a sputtering method, a plating method (an electroplating method or an electroless plating method), or the like (see FIG. 2). Here, the thickness of the conductive layer 110 is preferably greater than or equal to 0.1 nm and less than or equal to 10 nm.

Before the conductive layer is formed over the surface of the active material, an oxide film such as a natural oxide film, which is formed on the surface of the active material layer, may be removed. The oxide film such as a natural oxide film, which is formed on the surface of the active material layer 103 including silicon, can be removed by wet etching treatment using, as an etchant, a solution including hydrofluoric acid or an aqueous solution including hydrofluoric acid. As the etching treatment for removing the oxide film such as a natural oxide film, dry etching treatment may be used. Alternatively, wet etching treatment and dry etching treatment may be used in combination. For the dry etching treatment, a parallel plate reactive ion etching (RIE) method, an inductively coupled plasma (ICP) etching method, or the like can be used.

Here, the conductive layer 110 can be formed by a CVD method, a sputtering method, a plating method (an electroplating method or an electroless plating method), or the like with the use of a metal element having high conductivity typified by copper, nickel, titanium, manganese, cobalt, aluminum, magnesium, iron, or the like, preferably copper or nickel in particular. The conductive layer 110 includes at least one of the above metal elements, and may be formed as a metal layer (including a layer of an alloy such as $Mg_xAl_{1-x}$ (x is greater than 0 and less than 1) or $Al_xTi_{1-x}$ (x is greater than 0 and less than 1)). The conductive layer 110 may form silicide with silicon of the active material layer 103.

Further, in the case where a metal element having a high reducing property, such as titanium, is used for the conductive layer 110, the oxide film such as a natural oxide film, which is formed on the surface of the active material layer 103, can be reduced by titanium included in the conductive layer 110 without removal of the oxide film.

Note that in the case where whisker-like crystalline silicon is used for the active material layer 103, it is preferable to employ a metal organic chemical vapor deposition (MOCVD) method to form a film of the above metal element which is used for the conductive layer 110.

Further, it is preferable to use an element having low reactivity to lithium, such as copper or nickel, for the conductive layer 110. Silicon included in the active material layer 103 expands when lithium ions are absorbed and shrinks when lithium ions are released. Therefore, in some cases, the active material layer 103 is destroyed when charge and discharge are repeated. However, by covering the active material layer 103 with the conductive layer 110 including copper or nickel, the active material layer 103 can be prevented from being destroyed even charge and discharge are repeated because silicon, which is separated owing to the change in volume caused by absorption and release of lithium ions, can be kept in the active material layer 103. Accordingly, the cycle characteristics of the energy storage device can be improved.

By forming the conductive layer over the surface of the active material after lithium is introduced into the silicon layer, the conductive layer can be formed over the surface of the active material in an expansion state due to the introduction of lithium; thus, the active material can be prevented from being deformed by change in volume due to absorption and release of lithium ions.

Figure 3:
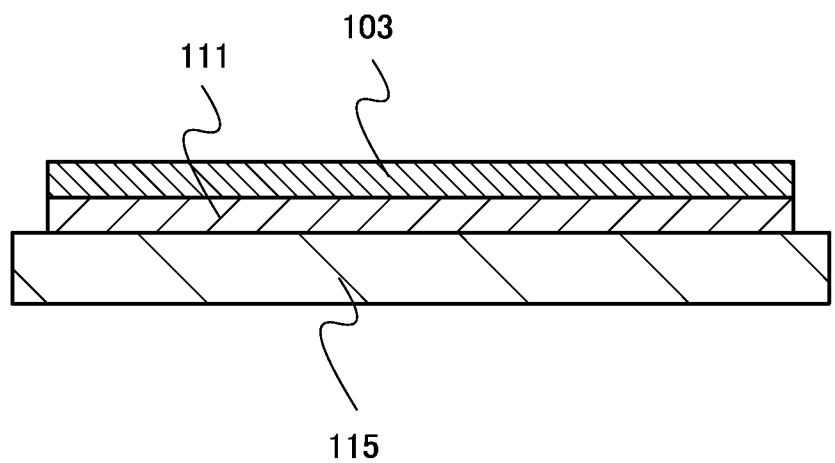
FIG. 3 is an example of a cross-sectional view illustrating a method for manufacturing a negative electrode of an energy storage device.

Note that FIGS. 1A to 1D illustrate the case where the current collector 101 is formed using a conductive material having a foil shape, a plate shape, or a net shape; however, as illustrated in FIG. 3, a current collector 111 can be formed over a substrate 115 by using a sputtering method, an evaporation method, a printing method, an inkjet method, a CVD method, or the like as appropriate.

Through the above steps, an electrode of an energy storage device, in which lithium is introduced into a silicon layer, can be manufactured.

Embodiment 2

In this embodiment, a structure of an energy storage device will be described with reference to FIGS. 4A and 4B.

First, a structure of a secondary battery is described below as an energy storage device.

Among secondary batteries, a lithium ion battery formed using a metal oxide including lithium, such as $LiCoO_2$, has a high discharge capacity and high safety.

Figure 4A:
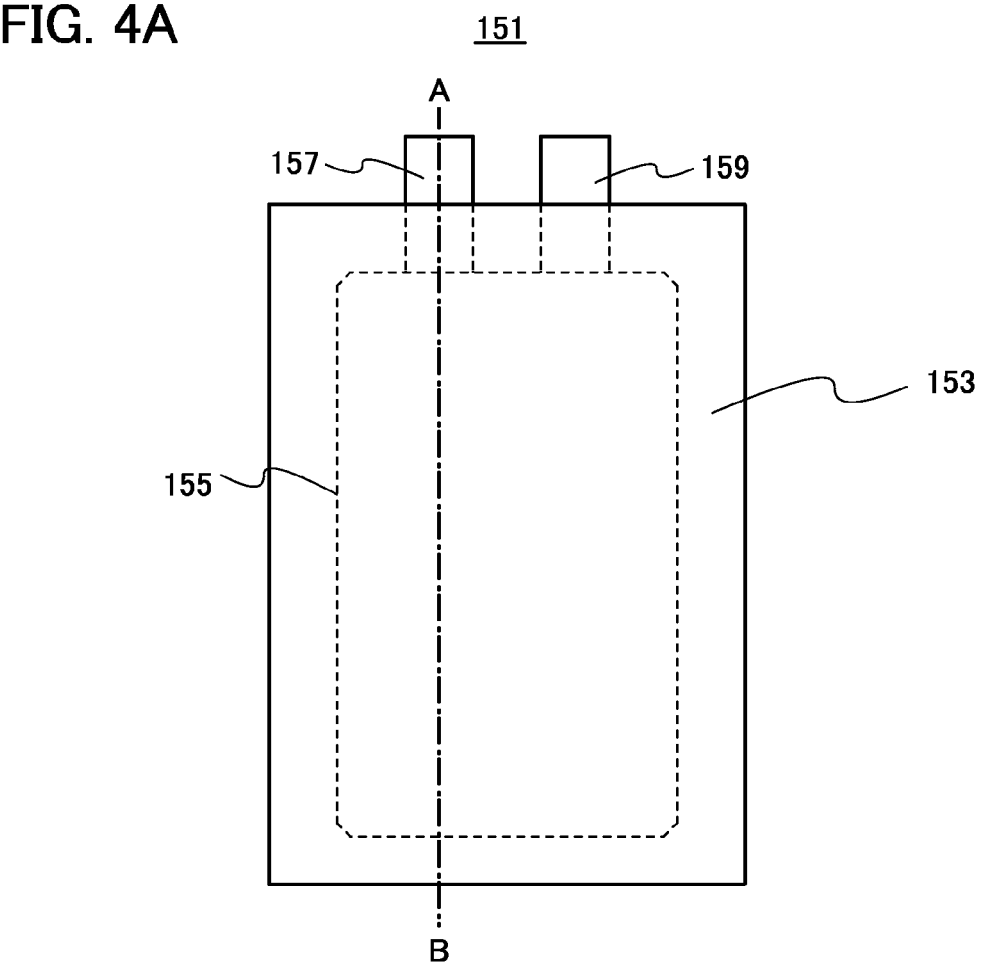
FIGS. 4A and 4B are an example of a plan view and an example of a cross-sectional view, respectively, which illustrate one embodiment of an energy storage device.
Figure 4B:
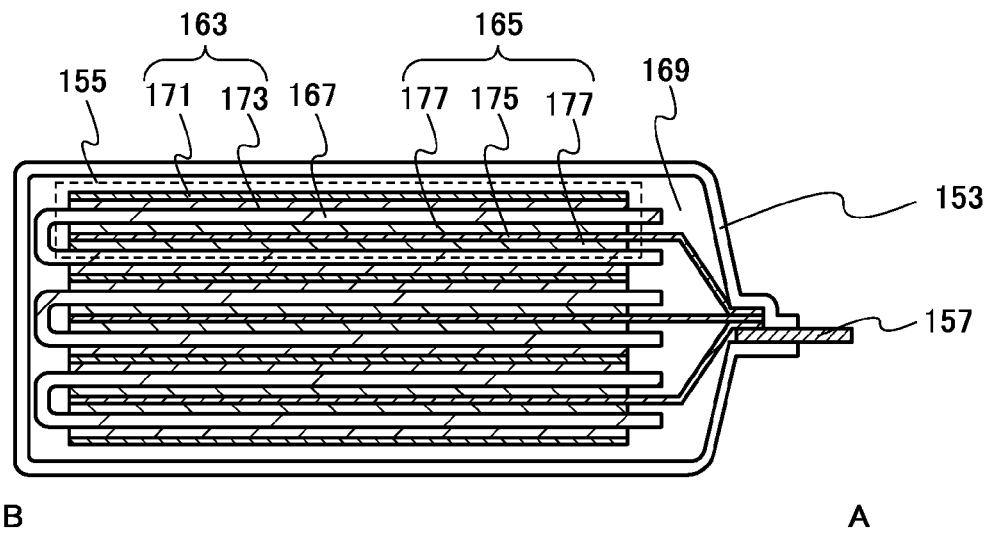

FIG. 4A is a plan view of an energy storage device 151, and FIG. 4B is a cross-sectional view taken along dot-dashed line A-B in FIG. 4A.

The energy storage device 151 illustrated in FIG. 4A includes a power storage cell 155 in an exterior member 153. The energy storage device 151 further includes terminal portions 157 and 159 which are connected to the power storage cell 155. As the exterior member 153, a laminate film, a polymer film, a metal film, a metal case, a plastic case, or the like can be used.

As illustrated in FIG. 4B, the power storage cell 155 includes a negative electrode 163, a positive electrode 165, a separator 167 between the negative electrode 163 and the positive electrode 165, and an electrolyte 169 with which a region surrounded by the exterior member 153 is filled.

The negative electrode 163 includes a negative electrode current collector 171 and a negative electrode active material layer 173.

The positive electrode 165 includes a positive electrode current collector 175 and a positive electrode active material layer 177. The negative electrode active material layer 173 is formed on one or both surfaces of the negative electrode current collector 171. The positive electrode active material layer 177 is formed on one or both surfaces of the positive electrode current collector 175.

The negative electrode current collector 171 is connected to the terminal portion 159. The positive electrode current collector 175 is connected to the terminal portion 157. Further, the terminal portions 157 and 159 partly extend outside the exterior member 153.

Note that although a sealed thin energy storage device is described as the energy storage device 151 in this embodiment, the energy storage device can have a variety of structures; for example, a button energy storage device, a cylindrical energy storage device, or a rectangular energy storage device can be used. Further, although the structure where the positive electrode, the negative electrode, and the separator are stacked is described in this embodiment, a structure where the positive electrode, the negative electrode, and the separator are rolled may be employed.

As the negative electrode current collector 171, the current collector 101 or 111 described in Embodiment 1 can be used.

As the negative electrode active material layer 173, the active material layer 103 formed using the silicon layer described in Embodiment 1 can be used. Since lithium is introduced into the silicon layer, a substance which does not include lithium can be used for the positive electrode active material.

Aluminum, stainless steel, or the like is used for the positive electrode current collector 175. The positive electrode current collector 175 can have a foil shape, a plate shape, a net shape, or the like as appropriate.

The positive electrode active material layer 177 can be formed using a material such as $LiFeO_2$, $LiCoO_2$, $LiNiO_2$, $LiMn_2O_4$, $LiFePO_4$, $LiCoPO_4$, $LiNiPO_4$, $LiMn_2PO_4$, $V_2O_5$, $Cr_2O_5$, $MnO_2$, or another lithium compound. Note that in the case where carrier ions are alkali metal ions other than lithium ions, alkaline earth metal ions, beryllium ions, or magnesium ions, the positive electrode active material layer 177 can be formed using, instead of lithium in the above lithium compounds, an alkali metal (e.g., sodium or potassium), an alkaline earth metal (e.g., calcium, strontium, or barium), beryllium, or magnesium.

As a solute of the electrolyte 169, a material in which lithium ions that are carrier ions can transfer and exist stably is used. Typical examples of the solute of the electrolyte include lithium salt such as $LiClO_4$, $LiAsF_6$, $LiBF_4$, $LiPF_6$, and $Li(C_2F_5SO_2)_2N$. Note that in the case where carrier ions are alkali metal ions other than lithium ions, alkaline earth metal ions, beryllium ions, or magnesium ions, the solute of the electrolyte 169 can include alkali metal salt such as sodium salt or potassium salt, alkaline earth metal salt such as calcium salt, strontium salt, or barium salt, beryllium salt, magnesium salt, or the like, as appropriate.

As the solvent of the electrolyte 169, a material which can transfer lithium ions is used. As the solvent of the electrolyte 169, an aprotic organic solvent is preferably used. Typical examples of the aprotic organic solvent include ethylene carbonate, propylene carbonate, dimethyl carbonate, diethyl carbonate, γ-butyrolactone, acetonitrile, dimethoxyethane, tetrahydrofuran, and the like, and one or more of these materials can be used. When a gelled polymer is used as the solvent of the electrolyte 169, safety against liquid leakage or the like is increased. Further, a structure for preventing liquid leakage can be simplified with the use of a gelled polymer, and thus the energy storage device 151 can be thin and lightweight. Typical examples of the gelled polymer include a silicon gel, an acrylic gel, an acrylonitrile gel, polyethylene oxide, polypropylene oxide, a fluorine-based polymer, and the like.

As the electrolyte 169, a solid electrolyte such as $Li_3PO_4$ can be used.

An insulating porous material is used for the separator 167. Typical examples of the separator 167 include cellulose (paper), polyethylene, polypropylene, and the like.

A lithium ion battery has a small memory effect, a high energy density, and a high discharge capacity. In addition, the driving voltage of a lithium ion battery is high. Thus, the size and weight of the lithium ion battery can be reduced. Further, the lithium ion battery does not easily deteriorate owing to repeated charge and discharge and can be used for a long time, so that cost can be reduced.

Next, a capacitor is described as an energy storage device. Typical examples of the capacitor include an electrical double-layer capacitor, a lithium ion capacitor, and the like.

In the case of a capacitor, instead of the positive electrode active material layer 177 in the secondary battery in FIG. 4B, a material capable of reversibly adsorbing or absorbing lithium ions and/or anions may be used. Typically, the positive electrode active material layer 177 can be formed using active carbon, a conductive polymer, or a polyacene organic semiconductor (PAS), for example.

The lithium ion capacitor has high efficiency of charge and discharge, capability of rapid charge and discharge, and a long life to withstand repeated use.

The electrode including the current collector and the active material layer, which is described in Embodiment 1, is used as the negative electrode of such a capacitor, whereby an energy storage device including an electrode in which lithium is introduced into a silicon layer can be manufactured. Inclusion of lithium in the silicon layer can increase the electric conductivity of the silicon layer and reduce the internal resistance of the energy storage device, which leads to improvement in energy efficiency.

Note that the energy storage device including the electrode which is one embodiment of the disclosed invention is not limited to those described above. For example, the electrode including the current collector and the active material layer, which is described in Embodiment 1, can be used as a negative electrode of an air cell which is another embodiment of the energy storage device. Also in this case, an energy storage device including an electrode in which lithium is introduced into a silicon layer can be manufactured.

This embodiment can be implemented in combination with any of the other embodiments and the like.

Embodiment 3

In this embodiment, a capacity design of the energy storage device (the secondary battery) described in Embodiment 2 will be described.

Positive electrode capacity refers to the amount of electric charge which can be stored in and released from (i.e., the amount of lithium which can be stored in and released from) only the positive electrode active material layer 177 described in Embodiment 2. Negative electrode capacity refers to the amount of electric charge which can be stored in and released from (i.e., the amount of lithium which can be stored in and released from) only the negative electrode active material layer 173.

In the design of the energy storage device, energy per unit weight or per unit volume can be maximized by setting the positive electrode capacity and the negative electrode capacity to be the same level. However, if one of the positive electrode capacity and the negative electrode capacity is higher than the other, an active material which does not contribute to charge and discharge exists in the energy storage device; therefore, the energy density of the energy storage device is decreased.

The amount of electric charge which is stored by charge but is not released by discharge is referred to as irreversible capacity. The irreversible capacity is considered to include a component of electric charge used for forming a nonconducting film and a component of electric charge derived from lithium which enters the positive electrode or the negative electrode but is not released. The component of electric charge used for forming the nonconducting film is compensated by external power feeding; therefore, the capacity of the energy storage device itself is not decreased. On the other hand, when lithium is not released from the positive electrode or the negative electrode, the capacity of the energy storage device is decreased.

In an energy storage device manufactured so that the positive electrode capacity and the negative electrode capacity are the same level, the capacity of the energy storage device might be decreased in the case where lithium is not released from one of the positive electrode and the negative electrode.

When it is known in advance that the negative electrode has irreversible capacity due to lithium which is not released, lithium with an amount corresponding to the irreversible capacity is preferably included in the negative electrode active material beforehand so that the negative electrode capacity includes the additional capacity corresponding to the irreversible capacity. In this manner, a stable energy storage device whose capacity is not decreased by cycle operation can be manufactured, though the initial energy density of the energy storage device is slightly decreased.

Electric charge of the irreversible capacity due to lithium which is not released from the negative electrode can be released to some extent by setting discharge cutoff voltage low. However, when electric charge is released in such a manner, the active material might be deteriorated by overload and performance of the electrode might be degraded. Thus, a certain amount of lithium is included in advance in the negative electrode whose capacity is higher than the positive electrode capacity, whereby lithium stored in the negative electrode is not completely released; accordingly, the possibility that performance of the electrode is degraded can be reduced and the cycle characteristics of the energy storage device can be improved.

Embodiment 4

In this embodiment, an application example of the energy storage device described in Embodiment 2 will be described.

The energy storage device described in Embodiment 2 can be used in electronic devices, e.g., cameras such as digital cameras or video cameras, digital photo frames, mobile phones (also referred to as cellular phones or cellular phone devices), portable game machines, portable information terminals, audio reproducing devices, or personal computers. Further, the energy storage device can be used in electric propulsion vehicles such as electric cars, hybrid cars, train vehicles, maintenance vehicles, carts, wheelchairs, and bicycles.

Figure 5A:
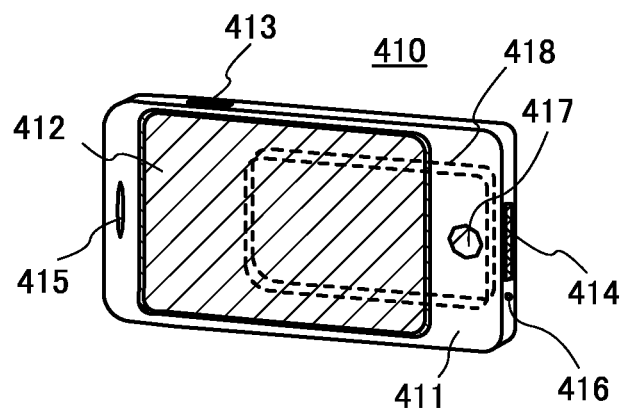
FIGS. 5A and 5B illustrate application examples of an energy storage device.

FIG. 5A illustrates an example of a mobile phone. In a mobile phone 410, a display portion 412 is incorporated in a housing 411. The housing 411 is provided with an operation button 413, an operation button 417, an external connection port 414, a speaker 415, a microphone 416, and the like. An energy storage device 418 is disposed inside the housing 411 and can be charged using the external connection port 414. The energy storage device described in Embodiment 2 can be used as the energy storage device 418 of the mobile phone 410.

Figure 5B:
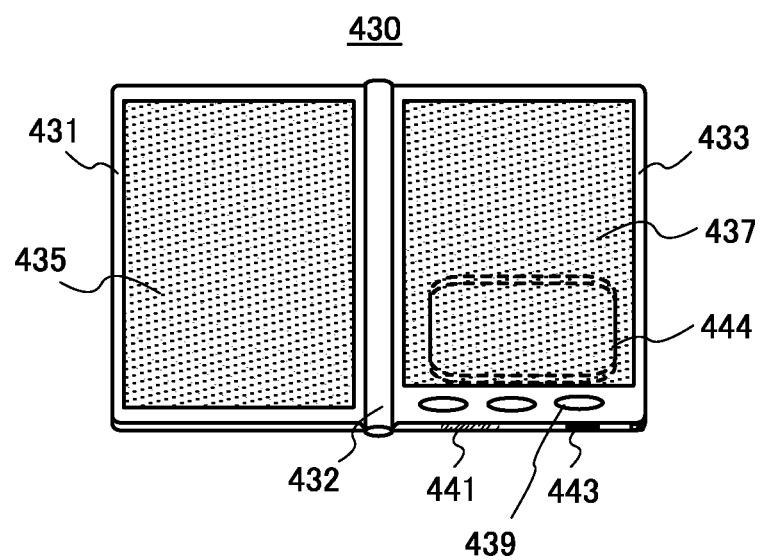

FIG. 5B illustrates an example of an electronic book terminal. An electronic book terminal 430 includes two housings, a first housing 431 and a second housing 433, which are combined with each other with a hinge 432. The first and second housings 431 and 433 can be opened and closed using the hinge 432 as an axis. A first display portion 435 and a second display portion 437 are incorporated in the first housing 431 and the second housing 433, respectively. In addition, the second housing 433 is provided with an operation button 439, a power switch 443, a speaker 441, and the like. An energy storage device 444 is incorporated in the housing 433 and can be charged using the power switch 443. The energy storage device described in Embodiment 2 can be used as the energy storage device 444 of the electronic book terminal 430.

Figure 6:
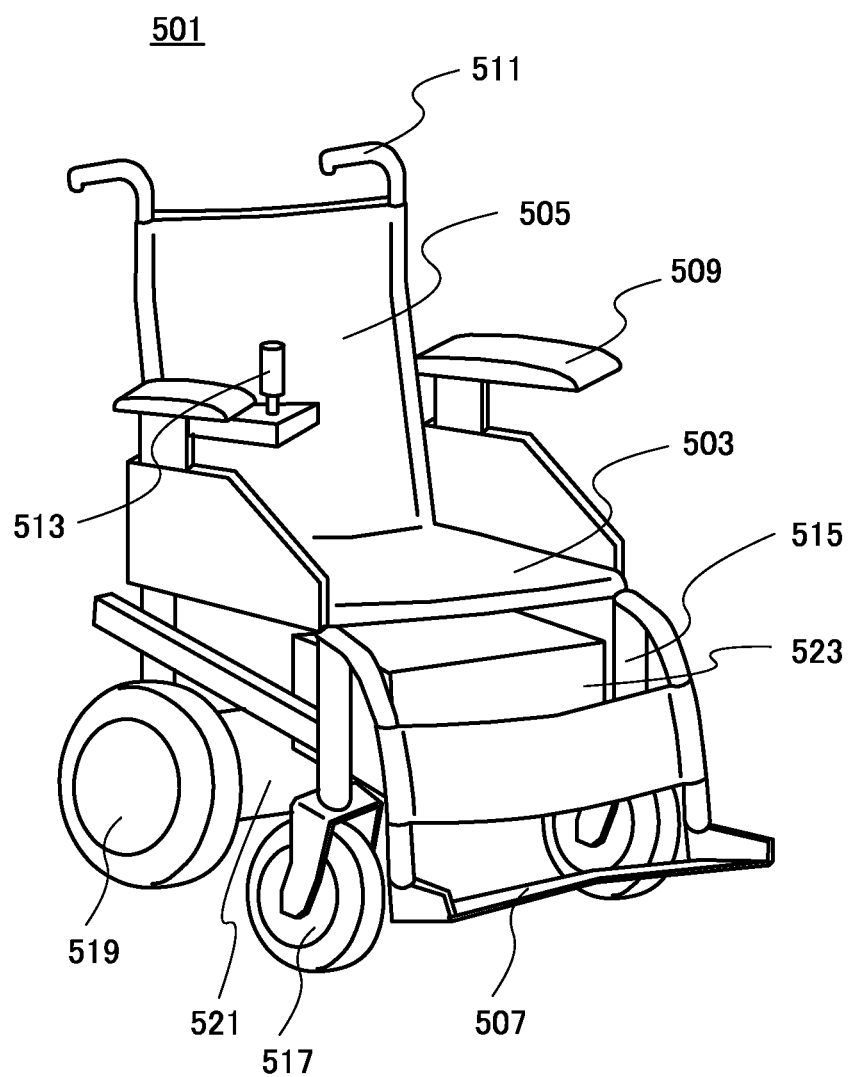
FIG. 6 is a perspective view illustrating an application example of an energy storage device.

FIG. 6 is a perspective view of an electric wheelchair 501. The electric wheelchair 501 includes a seat 503 where a user sits down, a backrest 505 provided behind the seat 503, a footrest 507 provided at the front of and below the seat 503, armrests 509 provided on the left and right of the seat 503, and a handle 511 provided above and behind the backrest 505. A controller 513 for controlling the operation of the wheelchair is provided for one of the armrests 509. With the use of a frame 515 provided below the seat 503, a pair of front wheels 517 is provided at the front of and below the seat 503 and a pair of rear wheels 519 is provided behind and below the seat 503. The rear wheels 519 are connected to a driving portion 521 including a motor, a brake, a gear, and the like. A control portion 523 including a battery, a power controller, a control means, and the like is provided under the seat 503. The control portion 523 is connected to the controller 513 and the driving portion 521. The driving portion 521 is driven through the control portion 523 with the operation of the controller 513 by the user and the control portion 523 controls the operation of moving forward, moving back, turning around, and the like, and the speed of the electric wheelchair 501.

The energy storage device described in Embodiment 2 can be used as the battery of the control portion 523. The battery of the control portion 523 can be charged by external power supply using a plug-in technique.

Figure 7:
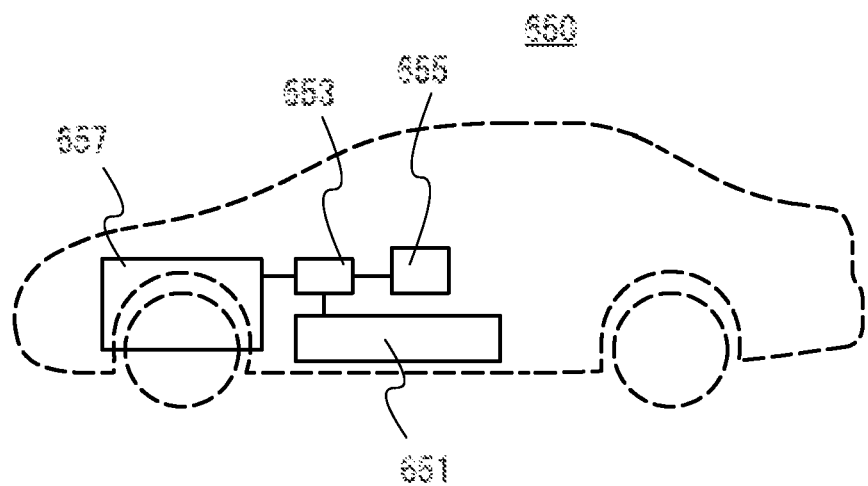
FIG. 7 illustrates an application example of an energy storage device.

FIG. 7 illustrates an example of an electric car. An energy storage device 651 is provided in an electric car 650. The output of electric power of the energy storage device 651 is controlled by a control circuit 653 and the electric power is supplied to a driving device 657. The control circuit 653 is controlled by a computer 655.

The driving device 657 includes a DC motor or an AC motor either alone or in combination with an internal-combustion engine. The computer 655 outputs a control signal to the control circuit 653 on the basis of input data such as data of operation (such as acceleration, deceleration, or stop) by a driver or data during driving (such as data on an upgrade or a downgrade, or data on a load on a driving wheel) of the electric car 650. The control circuit 653 adjusts the electric energy supplied from the energy storage device 651 in accordance with the control signal of the computer 655 to control the output of the driving device 657. In the case where the AC motor is mounted, an inverter which converts direct current into alternate current is incorporated.

The energy storage device described in Embodiment 2 can be used as the energy storage device 651 of the electric car 650. The energy storage device 651 can be charged by external power supply using a plug-in technique.

Note that in the case where the electric propulsion vehicle is a train vehicle, the train vehicle can be charged by power supply from an overhead cable or a conductor rail.

This embodiment can be combined with any of the other embodiments as appropriate.

Embodiment 5

In this embodiment, an example in which an energy storage device according to one embodiment of the present invention is used in a wireless power feeding system (hereinafter referred to as an RF power feeding system) will be described with reference to block diagrams in FIG. 8 and FIG. 9. In each of the block diagrams, independent blocks show elements within a power receiving device and a power feeding device, which are classified according to their functions. However, it may be practically difficult to completely separate the elements according to their functions; in some cases, one element can involve a plurality of functions.

First, the RF power feeding system is described with reference to FIG. 8.

A power receiving device 800 is an electronic device or an electric propulsion vehicle which is driven by electric power supplied from a power feeding device 900, and can be applied to another device which is driven by electric power, as appropriate. Typical examples of the electronic device include cameras such as digital cameras or video cameras, digital photo frames, mobile phones (also referred to as cellular phones or cellular phone devices), portable game machines, portable information terminals, audio reproducing devices, display devices, computers, and the like. Typical examples of the electric propulsion vehicle include electric cars, hybrid cars, train vehicles, maintenance vehicles, carts, wheelchairs, and the like. In addition, the power feeding device 900 has a function of supplying electric power to the power receiving device 800.

Figure 8:
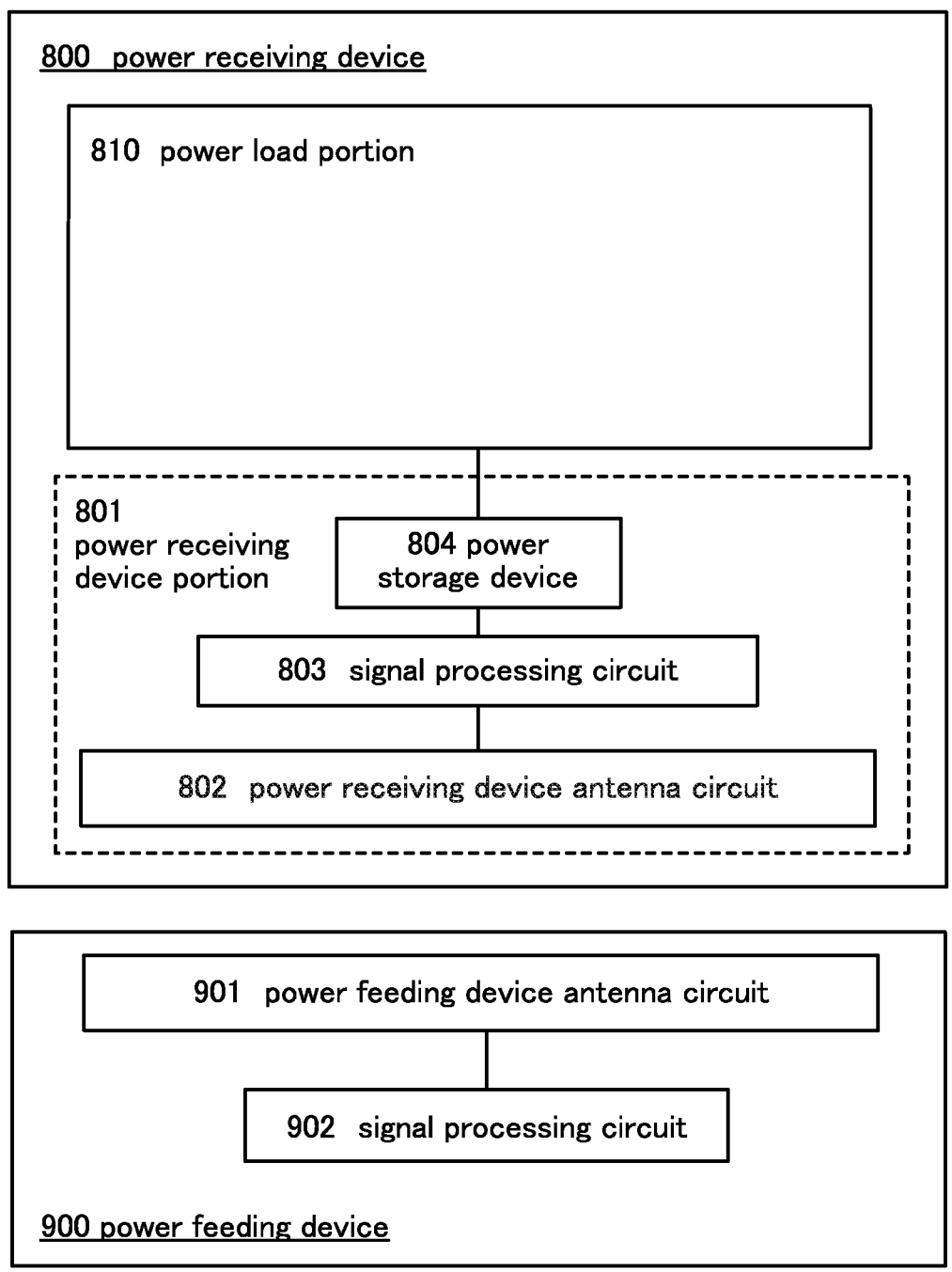
FIG. 8 illustrates an example of a structure of a wireless power feeding system.

In FIG. 8, the power receiving device 800 includes a power receiving device portion 801 and a power load portion 810. The power receiving device portion 801 includes at least a power receiving device antenna circuit 802, a signal processing circuit 803, and an energy storage device 804. The power feeding device 900 includes a power feeding device antenna circuit 901 and a signal processing circuit 902.

The power receiving device antenna circuit 802 has a function of receiving a signal transmitted by the power feeding device antenna circuit 901 or transmitting a signal to the power feeding device antenna circuit 901. The signal processing circuit 803 processes a signal received by the power receiving device antenna circuit 802 and controls charge of the energy storage device 804 and supply of electric power from the energy storage device 804 to the power load portion 810. The power load portion 810 is a driving portion which receives electric power from the energy storage device 804 and drives the power receiving device 800. Typical examples of the power load portion 810 include a motor, a driving circuit, and the like. Another device which receives electric power and drives the power receiving device can be used as appropriate as the power load portion 810. The power feeding device antenna circuit 901 has a function of transmitting a signal to the power receiving device antenna circuit 802 or receiving a signal from the power receiving device antenna circuit 802. The signal processing circuit 902 processes a signal received by the power feeding device antenna circuit 901. The signal processing circuit 902 controls the operation of the power feeding device antenna circuit 901. That is, the signal processing circuit 902 can control the intensity, the frequency, or the like of a signal transmitted by the power feeding device antenna circuit 901.

The energy storage device according to one embodiment of the present invention is used as the energy storage device 804 included in the power receiving device 800 in the RF power feeding system.

With the use of the energy storage device according to one embodiment of the present invention in the RF power feeding system, the amount of power storage can be larger than that of a conventional energy storage device. Therefore, the time interval of the wireless power feeding can be longer. That is, frequent power feeding can be omitted.

In addition, with the use of the energy storage device according to one embodiment of the present invention in the RF power feeding system, the power receiving device 800 can be compact and lightweight if the amount of power storage with which the power load portion 810 can be driven is the same as that of a conventional energy storage device. Therefore, the total cost can be reduced.

Next, another example of the RF power feeding system is described with reference to FIG. 9.

Figure 9:
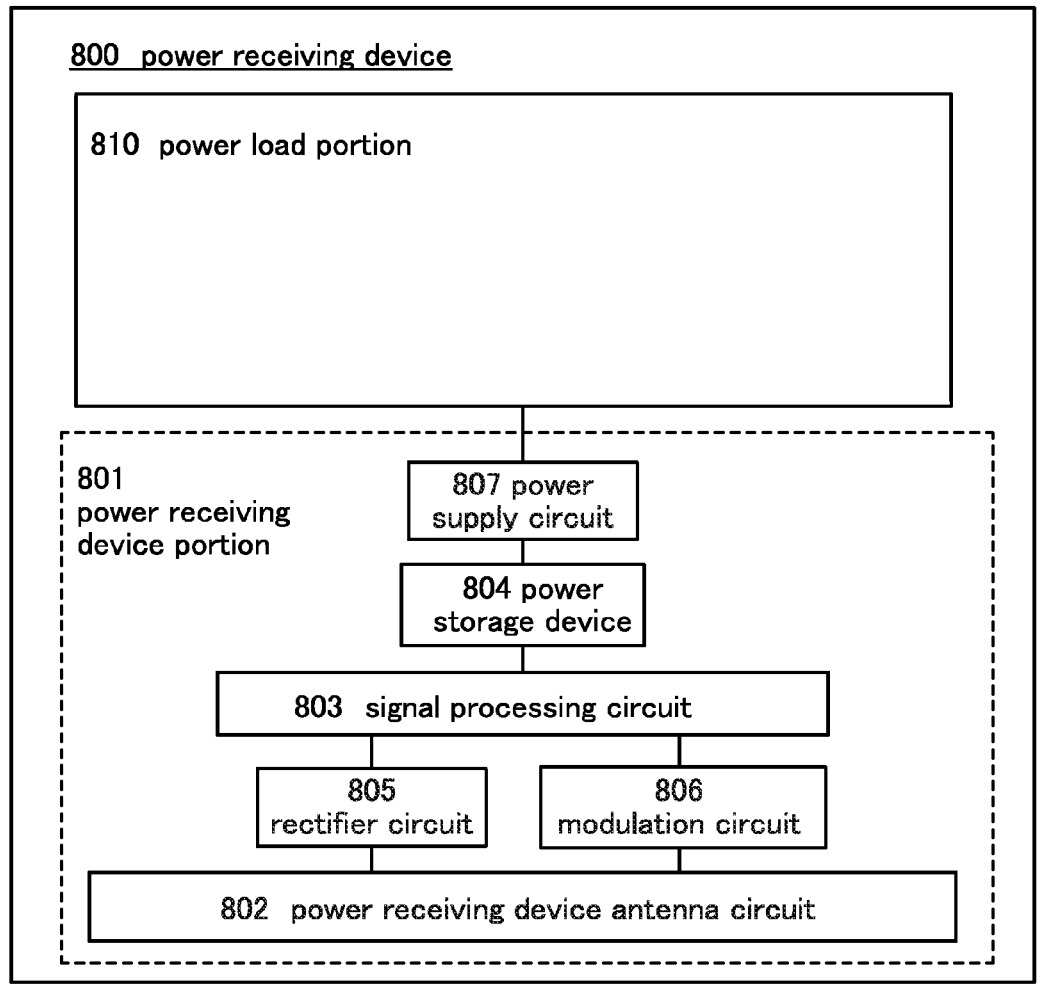
FIG. 9 illustrates an example of a structure of a wireless power feeding system.
Figure 9:
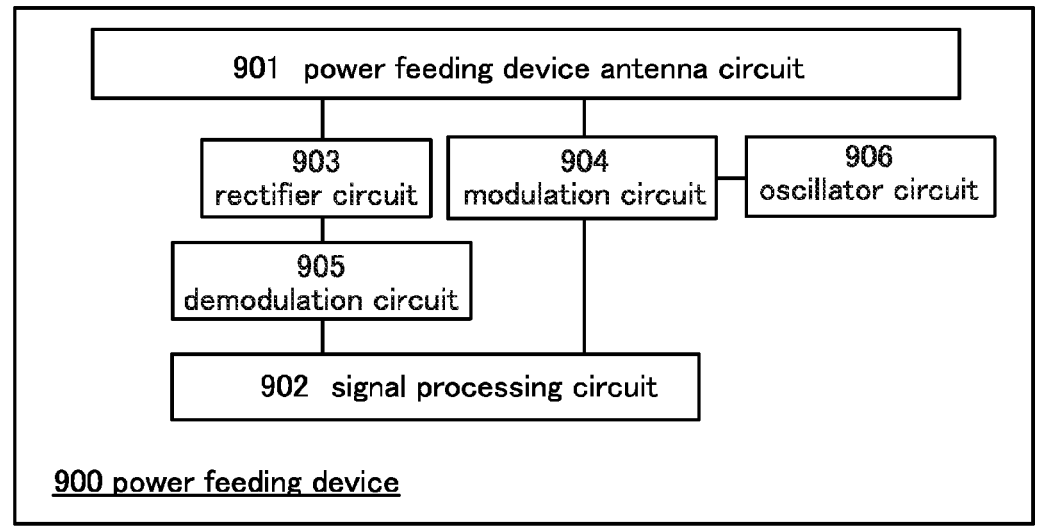

In FIG. 9, the power receiving device 800 includes the power receiving device portion 801 and the power load portion 810. The power receiving device portion 801 includes at least the power receiving device antenna circuit 802, the signal processing circuit 803, the energy storage device 804, a rectifier circuit 805, a modulation circuit 806, and a power supply circuit 807. In addition, the power feeding device 900 includes at least the power feeding device antenna circuit 901, the signal processing circuit 902, a rectifier circuit 903, a modulation circuit 904, a demodulation circuit 905, and an oscillator circuit 906.

The power receiving device antenna circuit 802 has a function of receiving a signal transmitted by the power feeding device antenna circuit 901 or transmitting a signal to the power feeding device antenna circuit 901. When the power receiving device antenna circuit 802 receives a signal transmitted by the power feeding device antenna circuit 901, the rectifier circuit 805 has a function of generating DC voltage from the signal received by the power receiving device antenna circuit 802. The signal processing circuit 803 has a function of processing a signal received by the power receiving device antenna circuit 802 and controlling charge of the energy storage device 804 and supply of electric power from the energy storage device 804 to the power supply circuit 807. The power supply circuit 807 has a function of converting voltage stored in the energy storage device 804 into voltage needed for the power load portion. The modulation circuit 806 is used when a certain response is transmitted from the power receiving device 800 to the power feeding device 900.

With the power supply circuit 807, electric power supplied to the power load portion 810 can be controlled. Thus, overvoltage application to the power load portion 810 can be suppressed, and deterioration or breakdown of the power receiving device 800 can be reduced.

In addition, with the modulation circuit 806, a signal can be transmitted from the power receiving device 800 to the power feeding device 900. Therefore, when the amount of electric power stored in the power receiving device 800 is judged to reach a certain amount, a signal is transmitted from the power receiving device 800 to the power feeding device 900 so that power feeding from the power feeding device 900 to the power receiving device 800 can be stopped. As a result, the energy storage device 804 is not fully charged; accordingly, deterioration of the energy storage device 804 can be suppressed and the number of charge times of the energy storage device 804 can be increased.

The power feeding device antenna circuit 901 has a function of transmitting a signal to the power receiving device antenna circuit 802 or receiving a signal from the power receiving device antenna circuit 802. When a signal is transmitted to the power receiving device antenna circuit 802, the signal processing circuit 902 generates a signal which is transmitted to the power receiving device. The oscillator circuit 906 is a circuit which generates a signal with a constant frequency. The modulation circuit 904 has a function of applying voltage to the power feeding device antenna circuit 901 in accordance with the signal generated by the signal processing circuit 902 and the signal with a constant frequency generated by the oscillator circuit 906. Thus, a signal is output from the power feeding device antenna circuit 901. On the other hand, when a signal from the power receiving device antenna circuit 802 is received, the rectifier circuit 903 has a function of rectifying the received signal. From signals rectified by the rectifier circuit 903, the demodulation circuit 905 extracts a signal transmitted from the power receiving device 800 to the power feeding device 900. The signal processing circuit 902 has a function of analyzing the signal extracted by the demodulation circuit 905.

Note that any circuit may be provided between circuits as long as the RF power feeding can be performed. For example, after the power receiving device 800 receives electromagnetic waves and the rectifier circuit 805 generates DC voltage, constant voltage may be generated by a circuit such as a DC-DC converter or a regulator provided in a subsequent stage. Thus, overvoltage application to the inside of the power receiving device can be suppressed.

The energy storage device according to one embodiment of the present invention is used as the energy storage device 804 included in the power receiving device 800 in the RF power feeding system.

With the use of the energy storage device according to one embodiment of the present invention in the RF power feeding system, the amount of power storage can be larger than that of a conventional energy storage device. Therefore, the time interval of the wireless power feeding can be longer. That is, frequent power feeding can be omitted.

In addition, with the use of the energy storage device according to one embodiment of the present invention in the RF power feeding system, the power receiving device 800 can be compact and lightweight if the amount of power storage with which the power load portion 810 can be driven is the same as that of a conventional energy storage device. Therefore, the total cost can be reduced.

Note that in the case where the energy storage device according to one embodiment of the present invention is used in the RF power feeding system and the power receiving device antenna circuit 802 and the energy storage device 804 overlap with each other, it is preferable that the impedance of the power receiving device antenna circuit 802 be not changed by deformation of the energy storage device 804 due to charge and discharge of the energy storage device 804 and deformation of an antenna due to the above deformation. When the impedance of the antenna is changed, in some cases, electric power is not supplied sufficiently. The energy storage device 804 may be placed in a battery pack formed using metal or ceramics, for example. Note that in that case, the power receiving device antenna circuit 802 and the battery pack are preferably separated from each other by several tens of micrometers or more.

In this embodiment, the charging signal has no particular limitation on its frequency and may have any band of frequency as long as electric power can be transmitted. For example, the charging signal may have any of an LF band of 135 kHz (long wave), an HF band of 13.56 MHz, a UHF band of 900 MHz to 1 GHz, and a microwave band of 2.45 GHz.

A signal transmission method may be selected as appropriate from various methods including an electromagnetic coupling method, an electromagnetic induction method, a resonance method, and a microwave method. In one embodiment of the present invention, in order to prevent energy loss due to foreign substances including moisture, such as rain and mud, an electromagnetic induction method or a resonance method using a low frequency band, specifically, frequencies of a short wave of 3 MHz to 30 MHz, a medium wave of 300 kHz to 3 MHz, a long wave of 30 kHz to 300 kHz, or a very-low frequency wave of 3 kHz to 30 kHz, is preferably used.

This embodiment can be implemented in combination with any of the other embodiments.

EXAMPLE 1

In this example, an experiment of lithium diffusion into a silicon wafer will be described.

In order to evaluate lithium diffusion into silicon, a silicon wafer was used instead of the active material layer 103. Immersion in concentrated sulfuric acid was performed as surface treatment of silicon to remove an organic substance or the like on the surface. After that, cleaning was performed using pure water. The silicon wafer was cut into a rectangle with a side of approximately 20 mm and used as a substrate for evaluation.

In this example, a method in which the substrate for evaluation was immersed in an aqueous solution including lithium was employed instead of applying the aqueous solution thereon because the substrate for evaluation was small. The substrate for evaluation was put on a Petri dish, and a saturated aqueous solution of lithium chloride was poured into the Petri dish to cover a surface of the substrate for evaluation. The substrate for evaluation was left and dried in this state until crystals of lithium chloride were precipitated on the surface of the substrate for evaluation. The substrate for evaluation may be put in a vacuum apparatus for time saving.

The substrate for evaluation was taken out of the Petri dish, and subjected to heat treatment using an electric furnace at 600° C. for 5 hours in a nitrogen atmosphere. After that, cleaning with pure water was performed to remove crystals left on the surface of the substrate for evaluation.

Then, secondary ion mass spectrometry (SIMS) analysis was performed, and the depth of diffused lithium, from the surface of the substrate for evaluation was evaluated.

Figure 10:
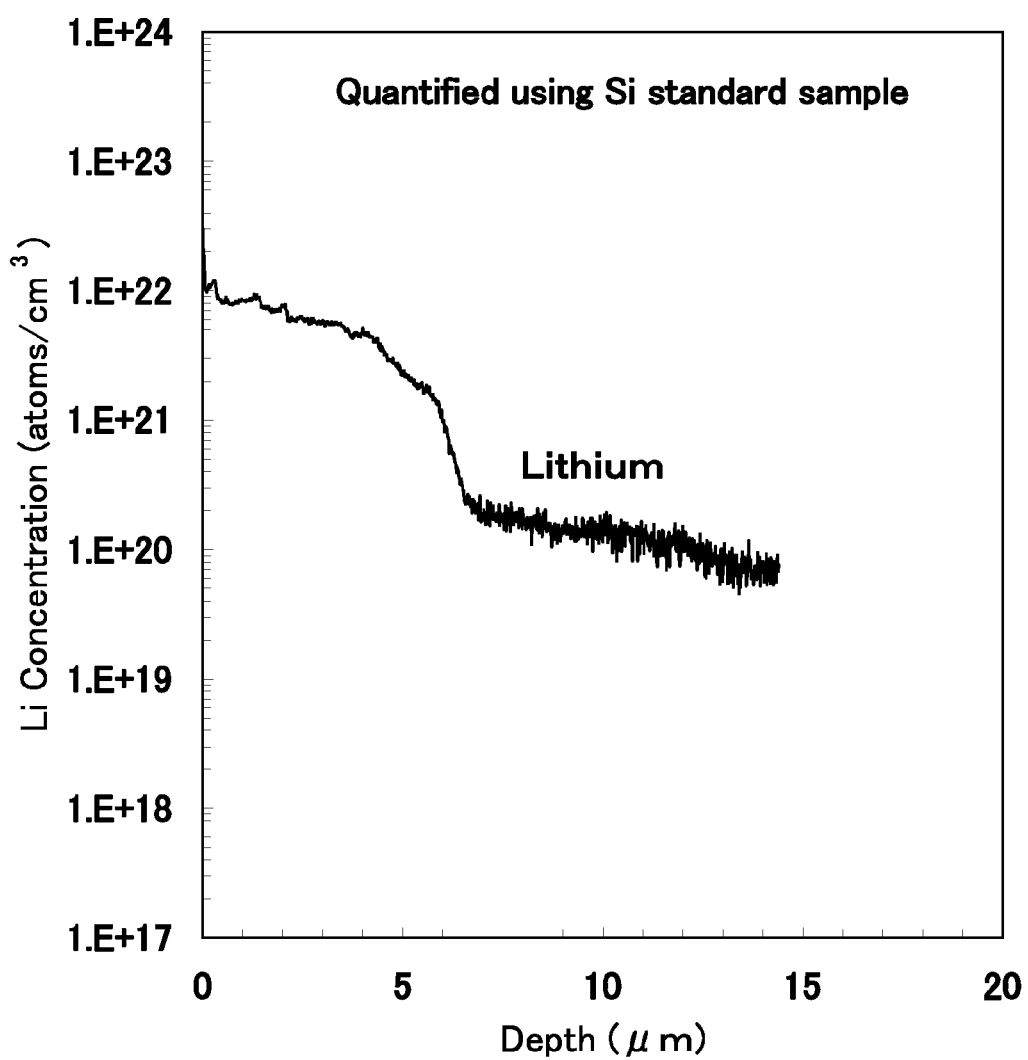
FIG. 10 shows a result of SIMS analysis.

FIG. 10 shows results of the SIMS analysis. The results show that lithium was diffused to approximately 7 μm from the surface of the silicon wafer at a high concentration.

The above results indicate that lithium can be diffused into silicon. Moreover, by adjusting the concentration or application amount of the aqueous solution, or the temperature or time of the heat treatment, the degree of diffusion into silicon can be controlled.

This application is based on Japanese Patent Application serial no. 2010-149840 filed with the Japan Patent Office on Jun. 30, 2010, the entire contents of which are hereby incorporated by reference.

What is claimed is:

1. A method for manufacturing an energy storage device, comprising the steps of:
    forming a silicon layer over a current collector;
    applying a solution comprising lithium and glucose on the silicon layer; and
    performing heat treatment so that the lithium is introduced from the solution into the silicon layer,
    wherein a lithium concentration in a superficial portion of the silicon layer becomes higher than a lithium concentration in a portion of the silicon layer which is close to the current collector by the heat treatment, and
    wherein the heat treatment is performed at a temperature higher than or equal to 500° C. and lower than or equal to 700° C.

2. A method for manufacturing an energy storage device, comprising the steps of:
    forming a silicon layer over a current collector;
    applying a liquid in which glucose is contained and in which a particle comprising lithium is dispersed on the silicon layer; and
    performing heat treatment so that the lithium is introduced from the liquid into the silicon layer,
    wherein a lithium concentration in a superficial portion of the silicon layer becomes higher than a lithium concentration in a portion of the silicon layer which is close to the current collector by the heat treatment, and
    wherein the heat treatment is performed at a temperature higher than or equal to 500° C. and lower than or equal to 700° C.

3. The method for manufacturing an energy storage device, according to claim 1,
    further comprising the step of forming a mixed layer between the current collector and the silicon layer,
    wherein the mixed layer is formed using silicon and a metal element included in the current collector.

4. The method for manufacturing an energy storage device, according to claim 1,
    wherein the silicon layer is a negative electrode active material layer.

5. The method for manufacturing an energy storage device, according to claim 2,
    further comprising the step of forming a mixed layer between the current collector and the silicon layer,
    wherein the mixed layer is formed using silicon and a metal element included in the current collector.

6. The method for manufacturing an energy storage device, according to claim 2,
    wherein the silicon layer is a negative electrode active material layer.

7. The method for manufacturing an energy storage device, according to claim 1, wherein the solution contains one material selected from lithium hydroxide, lithium oxide, lithium carbonate, lithium chloride, lithium metasilicate, lithium orthosilicate, lithium iodide, lithium acetate, lithium phosphate, and lithium nitrate.

8. The method for manufacturing an energy storage device, according to claim 2, wherein the liquid contains one material selected from lithium hydroxide, lithium oxide, lithium carbonate, lithium chloride, lithium metasilicate, lithium orthosilicate, lithium iodide, lithium acetate, lithium phosphate, and lithium nitrate.

9. A method for manufacturing an energy storage device, comprising the steps of:
    forming a silicon layer over a current collector;
    applying a solution comprising lithium and an organic substance on the silicon layer; and
    performing heat treatment so that the lithium is introduced from the solution into the silicon layer and the organic substance forms a carbon layer on the silicon layer,
    wherein a lithium concentration in a superficial portion of the silicon layer becomes higher than a lithium concentration in a portion of the silicon layer which is close to the current collector by the heat treatment, and
    wherein the heat treatment is performed at a temperature higher than or equal to 500° C. and lower than or equal to 700° C.

10. A method for manufacturing an energy storage device, comprising the steps of:
    forming a silicon layer over a current collector;
    applying a liquid in which an organic substance is contained and in which a particle comprising lithium is dispersed on the silicon layer; and
    performing heat treatment so that the lithium is introduced from the liquid into the silicon layer and the organic substance forms a carbon layer on the silicon layer,
    wherein a lithium concentration in a superficial portion of the silicon layer becomes higher than a lithium concentration in a portion of the silicon layer which is close to the current collector by the heat treatment, and
    wherein the heat treatment is performed at a temperature higher than or equal to 500° C. and lower than or equal to 700° C.

* * * * *